Dec. 30, 1969 MASAO TAKAMURA ET AL 3,487,344

COORDINATE SWITCHING DEVICE EMBODYING ELECTRIC WINDINGS COMMON TO COLUMNS OF MAGNETIC SWITCH ELEMENTS

Filed Dec. 7, 1967 5 Sheets-Sheet 1

Marn & Jangarathis
ATTORNEYS

Mann & Jangarathis
ATTORNEYS

Marn & Jangarathis
ATTORNEYS

Marn & Jangarathis
ATTORNEYS

Marn & Jangarathis
ATTORNEYS

United States Patent Office
3,487,344
Patented Dec. 30, 1969

3,487,344

COORDINATE SWITCHING DEVICE EMBODYING ELECTRIC WINDINGS COMMON TO COLUMNS OF MAGNETIC SWITCH ELEMENTS

Masao Takamura, Katsuhiro Kato, Takeo Shinohara, Hisahide Kikuchi, and Sadayuki Mitsuhashi, Tokyo, Japan, assignors to Nippon Telegraph & Telephone Public Corporation, Tokyo, Japan and Nippon Electric Company, Limited, Minato-ku, Tokyo, Japan Filed Dec. 7, 1967, Ser. No. 688,907
Claims priority, application Japan, Dec. 9, 1966, 41/80,403
Int. Cl. H01h *67/14*
U.S. Cl. 335—112 11 Claims

ABSTRACT OF THE DISCLOSURE

A magnetically actuated coordinate switching device including an array of switch elements disposed in rows and columns and comprising a plurality of magnetic plates, each formed with a plurality of spaced hollow dielectric spool on opposite surfaces thereof, each spool including interiorly thereof at least one sealed-in reed switch and magnetic core means, first electric windings on the outer surface of each spool in each row of spools on opposite surfaces of each plate, the magnetic plates disposed in side-by-side relation along edges of maximum dimensions in one plane to form a coordinate array of spools, reed switches, magnetic core means and first windings in rows and columns, second electric windings applied to the first windings on the spools in each column thereof, the second windings common to each column of spools, reed switches, magnetic core means and first windings, first bus bars of which each is connected to one reed in each reed switch in each row thereof, first terminals of which each is connected to one of the first bus bars, second bus bars of which each is connected to the other reed in each reed switch in each column thereof, and second terminals of which each is connected to one of the second bus bars.

This invention relates to a coordinate magnetic switch embodying an array of switch elements in rows and columns, and more specifically, to such switch in which electric windings are provided around each column of switch elements.

Coordinate magnetic switches having elements disposed in rows and columns are known in the prior art as exemplified in a technical article entitled "The Ferreed" and published in the Bell System Technical Journal, vol. 43, No. 1, Jan. 1964. Each of the switch elements includes a hollow dielectric spool molded onto a magnetic plate on opposite surfaces thereof to extend in a direction normal thereto, at least one reed switch and magnetic core means disposed interiorly of each spool, and a plurality of pairs of electric windings wound on an outer surface of each spool on opposite surfaces of the magnetic plate. Sufficient space is provided between adjacent spools in each row and column thereof to permit a winding bit to pass expeditiously around the perimeters of the respective spools without damaging the windings on adjacent spools in the process of applying each of the several windings to each spool. It is known that coordinate switches used for selecting talking paths in space division electronic switching systems constitute about sixty percent (60%) of the apparatus in such systems. As a consequence, the bulk, weight and cost of the magnetic switches are important factors in the functions thereof as well as in the economy of an entire electronic switching system embodying such switches.

Since the windings are applied to each spool after mounting on the magnetic plate as previously mentioned, it is difficult to miniaturize the coordinate switches by decreasing the distances between adjacent switch elements in the rows and columns thereof. As an increase in the number of turns in each winding applied to each dielectric spool is necessary to decrease the electric driving power, it has been found that a winding of a large number of turns for each dielectric spool in each coordinate magnetic switch is troublesome owing to the restriction imposed by the shape of the spool, the winding time is increased for the large number of turns, and the cost of the manufacture of the switches is increased. It has been further found that it is exceedingly difficult to decrease the driving current and at the same time to obtain surrounding circuits of a high-speed solid state for driving the coordinate magnetic switches.

The present invention contemplates an arrangement for improving the structure of a coordinate array of magnetically operated switches.

A principal object of the invention is to miniaturize a coordinate magnetic switch.

Another object is to reduce the bulk of a coordinate magnetic switch.

A further object is to reduce the cost of manufacture of a coordinate magnetic switch.

An additional object is to reduce the weight of a coordinate magnetic switch.

A still further object is to reduce the amount of current required to drive individual magnetic switches in a coordinate array thereof.

Still another object is to reduce the overall cost electronic switching systems by utilizing miniaturized coordinate magnetic switches.

In association with a coordinate magnetic switch including a plurality of hollow dielectric spools, a sealed-in reed switch and magnetic core means disposed interiorly of each spool and a pair of first winding wound in spaced relation externally on each spool, a specific embodiment of the present invention comprises a plurality of flat magnetic plates, each having the spools formed thereon to extend in spaced relation along a common axis on opposite surfaces in a direction normal thereto for permitting the application of the first winding pair thereto, the magnetic plates thereafter arranged in side-by-side relation along edges of maximum dimension in one plane to form a coordinate array of the spools, reed switches, magnetic core means and first windings in rows and columns, second electric windings applied onto the first windings on the spools in each column thereof on opposite surfaces of the respective plates in the one plane for making each second winding common to the first windings on one column of spools on opposite surfaces of the respective plates in the one plane, first bus bars of which each is connected to one reed of each reed switch in one row thereof, first terminals of which each is connected to one of the first bus bars, second bus bars of which each is connected to one reed of each reed switch in one column thereof, and second terminals of which each is connected to one of the second bus bars.

The invention is readily understood from the following description taken together with the accompanying drawing in which:

FIGS. 1(*a*) and 1(*b*) show a simplified assembly in cross-sectional form for illustrating the operation of a coordinate magnetic switching element when embodied in a coordinate array of discrete switching elements disposed in rows and columns in the prior art;

Figure 3:
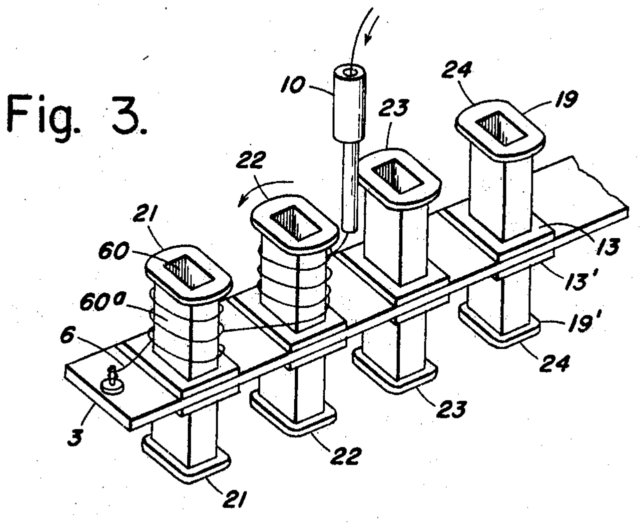
FIG. 3 is a fragmentary perspective view of a row of magnetic switching elements in accordance with a specific embodiment of the present invention.
Figure 4:
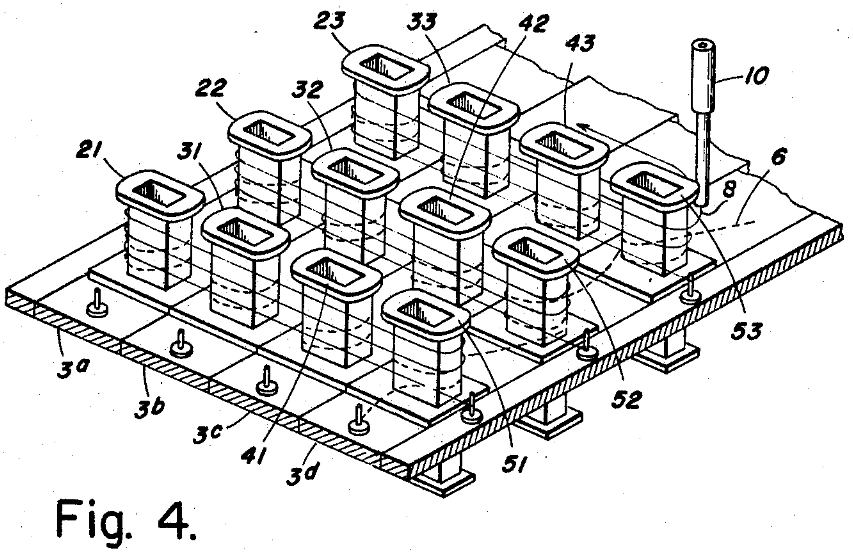
FIG. 4 is a fragmentary perspective view of an assembly of a plurality of the magnetic switching elements of FIG. 3 in accordance with the specific embodiment of the present invention.
Figure 6A:
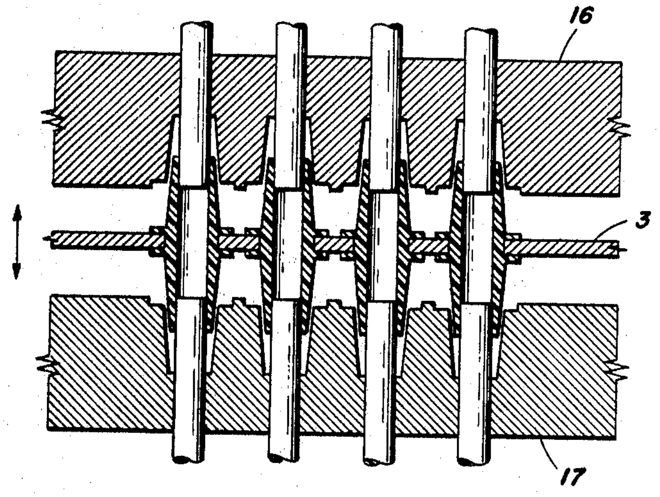
Figure 6B:
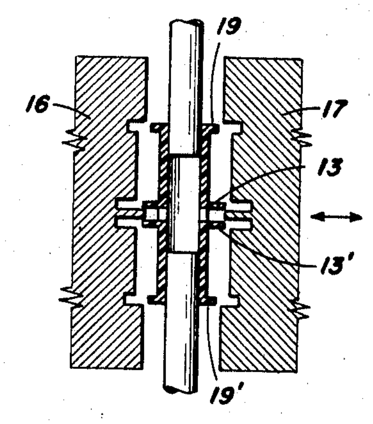
Figure 9A:
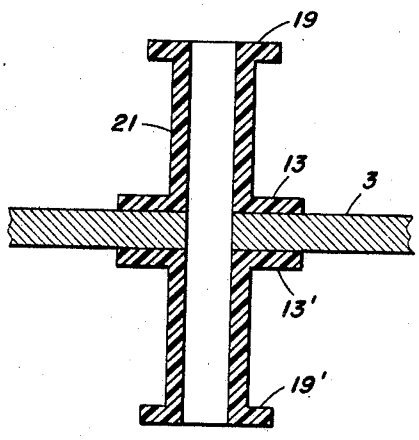
Figure 9B:
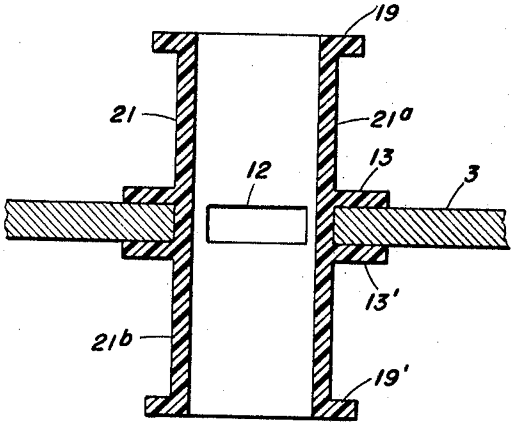
Figure 7:
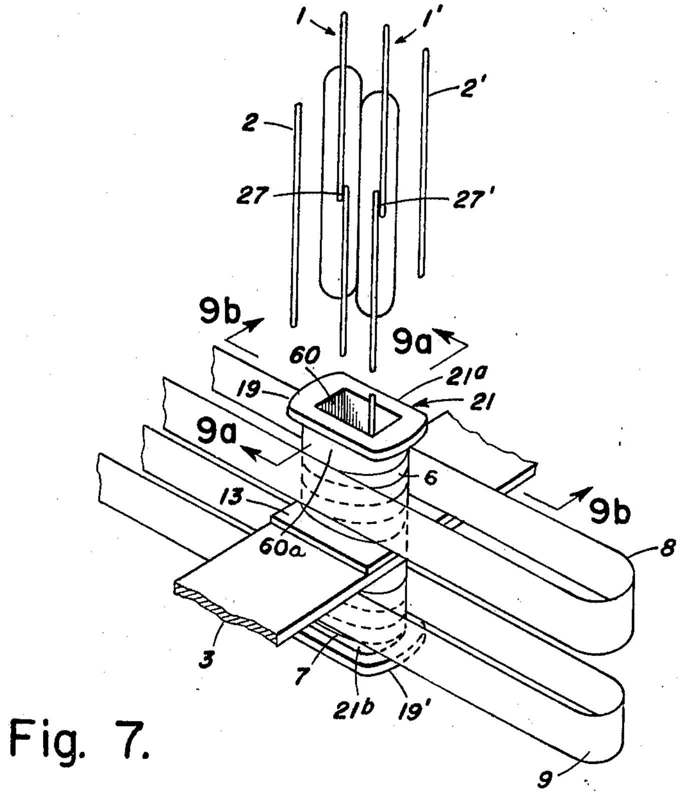
Figure 8:
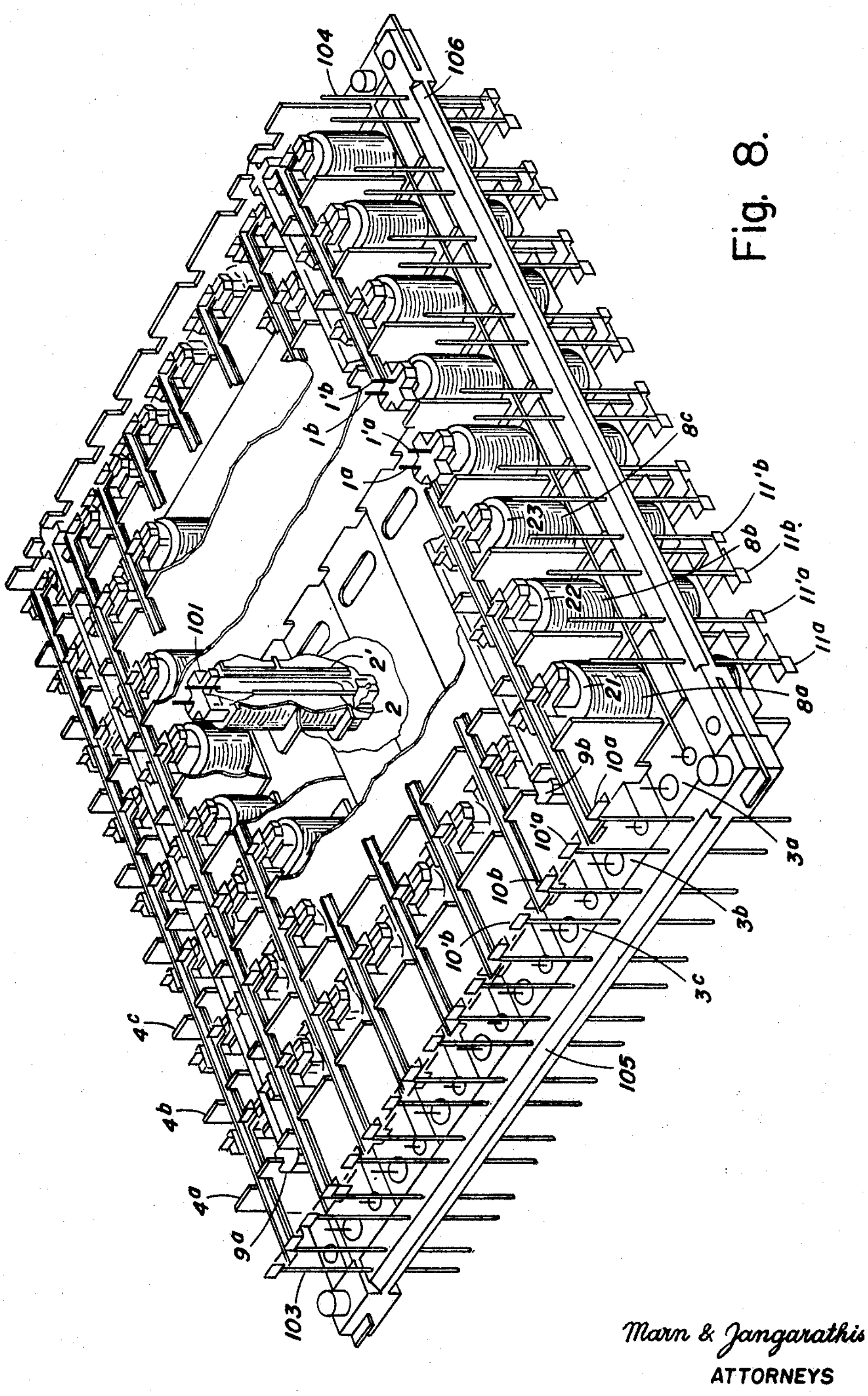

FIGS. 6(*a*) and (*b*) are cross-sectional views of movable molding members available in the prior art and usable in FIG. 3;

FIG. 7 is an exploded perspective view of a magnetically controlled switch usable in FIGS. 3, 4, 5 and 8;

FIG. 8 is a perspective view of a coordinate array of magnetically controllable switching elements of a type shown in FIGS. 3 and 4 in accordance with the present invention; and FIGS. 9(*a*) and (*b*) are cross-sectional views taken along lines 9*a*—9*a* and 9*b*—9*b*, respectively, in FIG. 7.

Figure 1A:
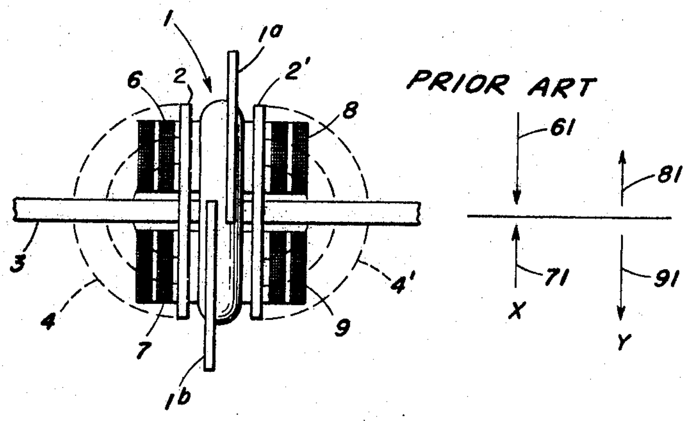
Figure 1B:
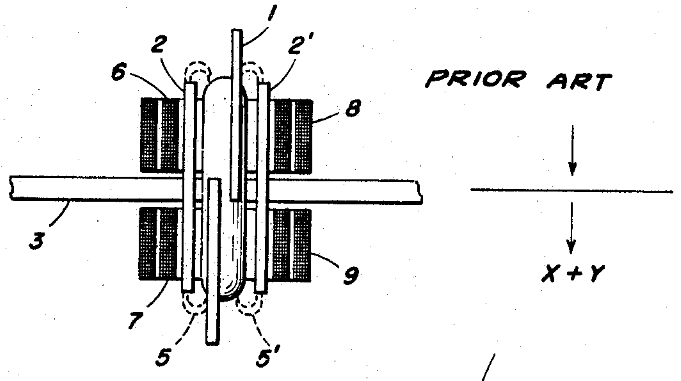
Figure 2:
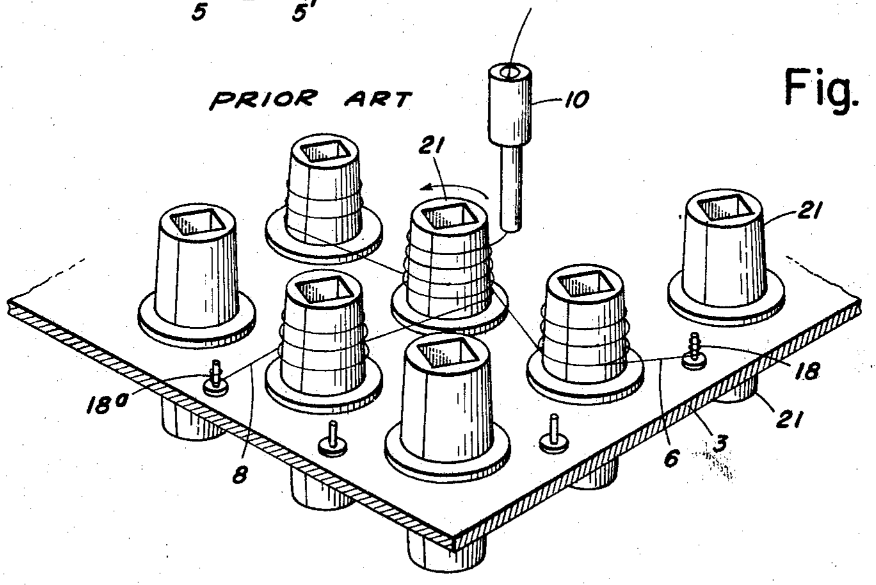
FIG. 2 is a fragmentary perspective view of a coordinate magnetic switching array in the prior art.

FIG. 1(*a*) shows an enclosed or sealed-in reed switch 1 embodying reed **1*a* and reed 1*b* disposed between spaced thin plate-like or bar-like magnetic cores 2 and 2′ of semi-hard magnetic materials and having overlapping ends disposed at a midpoint between opposite surfaces of flat shunt plate 3 of magnetic material. Primary windings 6 and 7 are wound around the magnetic cores 2 and 2′ on opposite surfaces of shunt plate 3, and secondary windings 8 and 9 are wound around the primary windings 6 and 7, respectively, on the opposite surfaces of shunt plate 3. Dielectric spools 21 shown in FIG. 2 are omitted from FIG. 1 for the purpose of simplifying the explanation of the operation of the latter figure. The reed switches, magnetic cores, primary and secondary windings are arranged in a coordinate array of rows and columns to constitute a coordinate array of magnetic switch elements disposed in rows and columns. Each winding 6 in each row is wound in series with corresponding windings in the same row adjacent to one of the two opposite surfaces of the shunt plate; each winding 8 in each column is wound in series with corresponding windings in the same column adjacent to the last-mentioned one of the two opposite surfaces of the shunt plate; each winding 7 in each row is wound in series with corresponding windings in the same row adjacent to the other of the two surfaces of the shunt plate; and each winding 9 in each column is wound in series with corresponding windings in the same column on the other of the two surfaces of the shunt plate; and each winding 9 in each column is wound in series with corresponding windings in the same column on the other of the two surfaces of the shunt plate. Windings 6 and 9 are provided with twice as many turns as windings 7 and 8**, respectively.

FIG. 1(*a*) which is in the prior art operates in the following manner. When either winding pair 6 and 7 or winding pair 8 and 9 is energized by an exciting current at a given time, magnetic cores 2 and 2′ are magnetized in opposite directions 61 and 71 or 81 and 91 shown in FIG. 1(*a*) to generate magnetic fluxes 4 or 4′, respectively, which are directed to shunt plate 3. As a consequence, the two reeds of the reed switch involved in respective rows and columns are permitted to remain in the unoperated state, i.e., the overlapping ends of the reeds of the respective reed switches are disengaged to establish a break-circuit. On the other hand, when both pairs of windings 6 and 7 and 8 and 9 are simultaneously energized by exciting currents at a given time, magnetic cores 2 and 2′ are magnetized in the same direction $(X+Y)$ in FIG. 1(*b*) to generate magnetic fluxes 5 and 5′ which are directed to the reed switch. This activates the two reeds of the reed switch to engage the overlapping ends thereof to establish a make-circuit.

From the foregoing, it is seen that shunt plate 3 divides each of the crosspoints in each row and column thereof into upper and lower halves (i.e., on opposite surfaces of the shunt plate), each of which is separately controllable. Owing to the magnetic circuit formed by shunt plate 3 in response to energizing current in either winding pair 6 and 7 or winding pair 8 and 9, the magnetic fluxes can be reduced to disengage the overlapping ends of the reeds to provide a break-circuit as desired. It is also seen that energizing or driving currents flowing simultaneously in both windings 6 and 7 and 8 and 9 of one row and column at a given time actuate the two reeds of the reed switch to engage the overlapping ends thereof in a make-circuit. This is so because magnetic cores 2 and 2′ are magnetized in the same direction shown in FIG. 1(*b*) as determined by twice-turn windings 6 and 9 in FIG. 1(*b*). Further details concerning the operation of the magnetic switch shown in FIG. 1(*a*) and 1(*b*) may be had by reference to the Bell System technical article, supra.

FIG. 2 illustrates the manner in which the windings 6, 7, 8 and 9 are applied to the coordinate magnetic switching device of the prior art shown in FIGS. 1(*a*) and 1(*b*). For this purpose, it is understood that each sealed-in switch and associated magnetic cores in FIGS. 1(*a*) and 1(*b*) are disposed, but not shown, interiorly of one of a plurality of dielectric or synthetic resin spools 21 in FIG. 2. These spools are molded in spaced relation onto magnetic shunt plate 3 via a plurality of suitably spaced holes or protuberances, not shown, to extend from both opposite surfaces of the latter plate in a direction normal thereto. It is understood that the spools are disposed in a coordinate array of rows and columns. Above the upper surface of shunt plate 3, the outer surface of each spool in FIG. 2. Electric terminals 18 and **18*a* are provided for 6 and 8**, respectively, in FIG. 1(*a*); and below the lower surface of shunt plate 3 in FIG. 2, the outer surface of each spool is wound with primary and secondary windings 7 and 9, respectively, in FIG. 1(*a*) but not shown in FIG. 2. Electric terminals 18 and 18a are provided for windings 6 and 8, respectively, on the upper surface of shunt plate 3; and it is understood that similar terminals, not shown, are provided on the lower surface of shunt plate 3 for windings 7 and 9.

In order to apply the windings 6, 7, 8 and 9 to each spool in FIG. 2, a well-known type of winding method causes winding bit 10 to move in a circular direction, for example, as indicated by the arrow around the outer circumference of each spool located above and below each of the opposite surfaces of shunt plate 3 with the view of increasing the reliability of the winding and economy of the winding method. It is apparent in FIG. 2 that sufficient space must be allowed between adjacent spools above and below the shunt plate to permit winding bit 10 to move expeditiously around each spool without impairing the winding being applied to a particular spool at the moment and at the same time avoiding damage to any windings that are already wound on one or more adjacent spools. This requires the minimum amount of space between adjacent spools to be provided with such factor of safety that permits winding bit 10 to move around the spools at the desired rotational speed and at the same time definitely precludes the possibility of damage to the particular winding being applied to a spool at the moment as well as to the windings already on adjacent spools. It is therefore obvious that the provision of such minimum amount of spacing between adjacent spools makes it impossible to miniaturize coordinate switching devices in the prior art from the standpoint of merely reducing the spacings between adjacent spools. Also, it is evident that, in view of the minimum amount of spacing required between adjacent spools in the prior art for the purpose above mentioned, it is hardly feasible to increase the number of winding turns on each spool at each crosspoint for reducing the amount of required driving current for the respective windings merely to obtain an economy in the man and machine hours required in the winding method.

In accordance with a specific embodiment of the present invention, the spacings between adjacent dielectric spools in the respective columns of a coordinate array of magnetic switch units including such spools and disposed in rows and columns are reduced to permit miniaturization of the array in the column-direction and at the same time the spacings between adjacent spools in the respective rows thereof are adequate to permit the application of the required number of windings to all spools in both rows and columns in a manner that is presently explained. FIG. 3 shows magnetic shunt plate 3 formed with a plurality of dielectric spools 21, 22, 23, 24 molded thereon to extend in spaced relation along a common axis on opposite surfaces of maximum dimension of the plates in a direction normal thereto. It is understood that the shunt plate may be provided with suitable holes, protuberances or the like, not shown, to permit the molding of the spools thereon with appropriate rigidity and firmness. It is obvious that the spools can be directly molded to the respective shunt plates without the aid of the holes, protuberances or the like. Each spool is provided with an axial opening 60 having an oblong configuration and extending throughout the length thereof, and with an external surface 60*a* having a corresponding oblong configuration.

Each spool is formed with two pairs of spaced integral flanges 13 and 19 and 13' and 19', FIGS. 6 and 9, in which flanges 19 and 19' have a smaller dimension and flanges 13 and 13' have larger dimensions relative to each other. Flanges 13 and 13' are positioned directly on the opposite surfaces of shunt plate 3 in FIG. 3 while flanges 19 and 19' are spaced therefrom. The two pairs of flanges serve a purpose that is subsequently stated. FIG. 3 further illustrates each spool 21 and the like molded onto shunt plate 3 in such manner that opposite external surfaces of larger dimension are disposed in a direction transverse to the common axis of the latter plate for a purpose that is later mentioned. It is understood that the oblong configurations of the spool internal opening and external surface are provided for a particular purpose that is hereinafter pointed out, and that such opening and outer surface are not limited to such configuration and may have other configurations, even a square, for a purpose that is also later identified.

FIG. 3 shows primary winding 6 of FIGS. 1(*a*) and 1(*b*) applied via winding bit 10 to the outer surface of spool 21 between flanges 13 and 19 above the upper surface of shunt plate 3 in one direction and to the outer surface of spool 22 between the corresponding flanges in a direction opposite to the winding direction on spool 21. It is understood, but not shown, that winding 6 is applied to spool 23 in a direction opposite to the winding direction on spool 22 but in the same as the winding direction on spool 21. Similarly, winding 6 is applied to spool 24 in a direction opposite to the winding direction on spool 23 but in the same as the winding direction on spool 22. Thus, winding 6 is continuous from spool to spool but in opposite directions on adjacent spools to minimize electrical interaction between the currents flowing in the windings on the latter spools. In a similar manner, primary winding 7 of FIGS. 1(*a*) and 1(*b*) is applied via winding bit 10 to the outer surface of spool 21 between flanges 13' and 19' below the lower surface of shunt plate 3 in FIG. 3, not shown, but in directions corresponding with the winding directions of winding 6 on the upper portions of the respective spools as above mentioned. Flanges 13 and 19 and 13' and 19' serve to retain the windings therebetween to obviate damage thereto. It is noted that the winding direction of winding bit 10 around the respective spools in FIG. 3 may be circular, elliptic or rectangular in conformity with the configuration of the external surfaces of the spools for a given coordinate switch. The winding bit is preferably cylindrical in shape and includes an axial opening through which the wire, which is suitably insulated is continuously and automatically fed onto the spools. The structure, rotational direction and operation of the winding bit are familiar to the art of winding electric coils of various types.

FIG. 4 shows an assembly of a plurality of spools and windings of FIG. 3 into a unitary coordinate array of spools and windings thereon disposed in rows and columns. For this purpose, shunt plates 3*a*, 3*b*, 3*c*, 3*d* . . ., in FIG. 4, each corresponding to shunt plate 3 in FIG. 3, are arranged in side-by-side relation along edges of maximum dimensions in one plane to form the unitary coordinate array. As shown in FIG. 4, spools 21, 22, 23 . . ., include portions positioned above the upper surface of magnetic shunt plate 3*a* constitute one row of spools having a first primary winding 6 would thereon in the manner explained above regarding shunt plate 3 in FIG. 3. It is understood that spools 21, 22, 23 . . ., in FIG. 4 include other portions positioned below the lower surface of magnetic shunt plate 3*a* in the manner of FIG. 3, but not shown, constitute another row of spools having a second primary winding 7 wound on the respective spool portions in the manner above pointed out regarding FIG. 3. Shunt plates 3*b*, 3*c*, 3*d* . . ., in FIG. 4 are understood to be identical with shunt plate 3*a* included therein. Thus, spools 31, 32, 33 . . ., on plate 3*b*, the spools 41, 42, 43 . . ., on plate 3*c*, and the spools 51, 52, 53 . . ., on plate 3*d* include primary windings 6 and 7, in the manner of plate 3*a* in FIG. 4, and constitute successive rows of spools having the primary windings 6 and 7 on the respective spool portions above and below the shunt plates. It is seen in FIG. 4 that spools 21, 31, 41, 51 . . ., form one column; spools 22, 32, 42, 52 . . ., form a second column; and that spools 23, 33, 43, 53 . . ., form a third column, and so on. It is evident in FIG. 4 that the coordinate array of spools and primary windings 6 and 7 thereon can be provided with as many rows and columns to provide a two-dimensional switching array as is necessary to achieve the desired flexibility in given electronic switching systems. It is thus seen that primary windings 6 and 7 are applied to the respective plates in FIG. 4 while each such plate is in the form in FIG. 3.

FIG. 4 also shows that a first secondary winding 8 in FIGS. 1(*a*) and 1(*b*) is applied via winding bit 10 onto first primary winding 6 already on spools 21, 31, 41, 51 . . ., disposed above the upper surfaces of the respective shunt plates and included in the left-hand column in FIG. 4 and that a second secondary winding 9 in FIG. 1(*a*) *and* 1(*b*) is applied onto second primary winding 7 already on spools 21, 31, 41, 51 . . ., below the lower surfaces of the respective shunt plates and included in the last-mentioned left-hand column in FIG. 4. It is noted that the secondary windings 8 and 9 engage primary windings 6 and 7, respectively, on the outer surfaces of maximum dimensions of spools 21, 31, 41, 51 . . ., to attain maximum effective use of the magnetic flux produced by the energizing current flowing in the respective windings. Similarly, additional secondary windings 8 and 9 are applied onto primary windings 6 and 7, respectively, already on spools 22, 32, 42, 52 . . ., forming the middle column in FIG. 4; and further secondary windings 8 and 9 are applied onto primary windings 6 and 7, respectively, already on spools 23, 33, 43, 53 . . ., forming the right-hand column in FIG. 4. It is thus seen that primary windings 6 and 7 are applied to each of spools 21, 22, 23 . . ., in FIGS. 3 and 4 while the spools are assembled in the manner of shunt plate 3 in FIG. 3 with adequate spacing between adjacent spools to permit expeditious movement of the winding bit between adjacent spools in the row thereof in the manner previously explained.

It is also seen that the secondary windings 8 and 9 are applied to the left-hand column of spools 21, 31, 41, 51 . . . , as well as to the middle and right-hand columns, while the spools are assembled in columns as shown in FIG. 4. As a consequence, the spacings between adjacent spools in each of the left-hand, middle and right-hand columns can be reduced to a minimum while at the same time allowing adequate spacings between adjacent columns of spools above and below the opposite surfaces of the respective shunt plates to permit an expeditious movement of the winding bit therebetween for the application of the secondary windings 8 and 9 to the respective columns of spools above and below the opposite surfaces of the respective shunt plates. This economy of space between adjacent spools in the respective columns thereof in FIG. 4 enables a miniaturization of the coordinate array of spools by shortening of the overall lengths of the respective columns. Furthermore, the application of secondary windings 8 and 9 to the primary windings 6 and 7 on each column of spools, i.e., making the latter pair of windings common to each column of spools, permits the use of winding bit 10 in a facile winding operation and of as few turns of each of the secondary windings 8 and 9 as is necessary to provide minimum driving current for actuating the reeds of the sealed-in reed switches in FIGS. 1(*a*) and 1(*b*) into make and break circuits in the manner hereinbefore explained.

Figure 5:
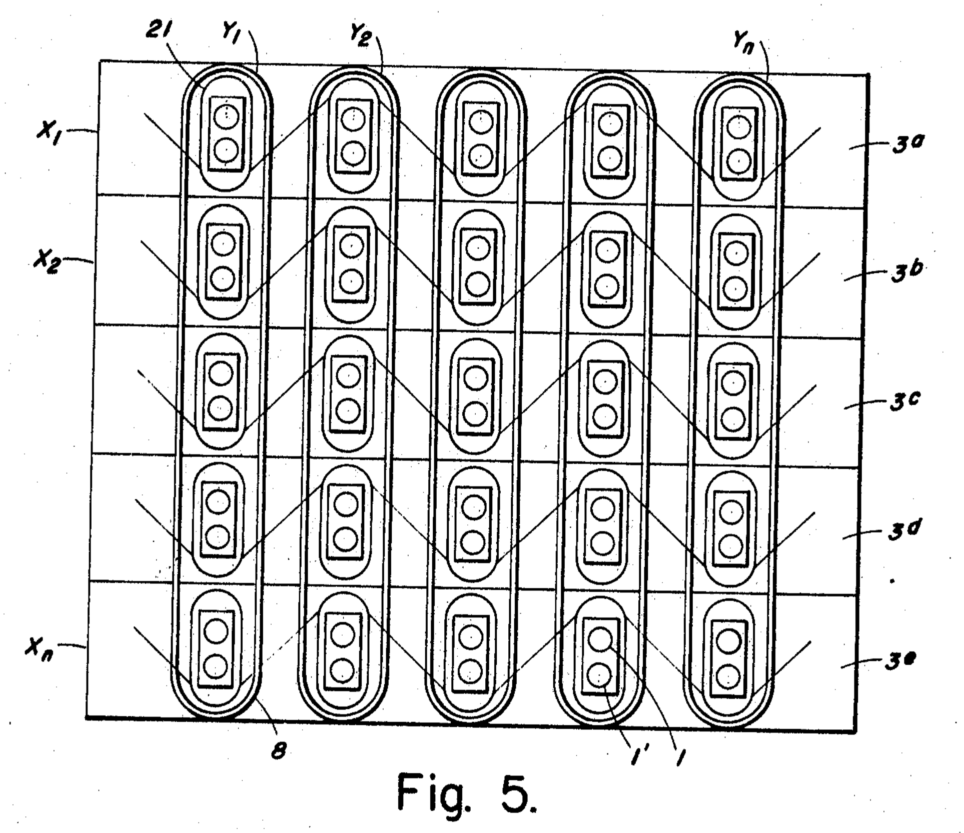
FIG. 5 is a plan view of a coordinate array of magnetic switch elements disposed in rows and columns in accordance with the specific embodiment of the present invention shown in FIG. 3.

FIG. 5 shows the top of a coordinate array of magnetic switch elements disposed in $X_1$, $X_2$ . . . $X_n$ rows and $Y_1$, $Y_2$ . . . $Y_n$ columns, and is understood to include a bottom, not shown, which is a duplicate of the top. Each spool in FIG. 5, identical with spool 21 and the like in FIGS. 3 and 4 includes a first primary winding 6 applied individually to each spool in each row X and first secondary winding 8 applied in common to the first primary winding 6 on all spools in each column Y above the upper surfaces of the respective shunt plates 3*a* . . . 3*e*, and a second primary winding 7 applied individually to each spool in each row X and second secondary winding 9 applied in common to the second primary winding 7 on all spools in each column Y below the lower surfaces of the respective shunt plates 3*a* . . . 3*e*, as hereinbefore explained regarding FIGS. 3 and 4. It is noted in FIG. 5 that each spool contains two sealed-in switches 1 and 1′ for the purpose of the present explanation and further that each spool can contain one sealed-in switch or three or more as hereinafter mentioned. The use of common secondary windings 8 and 9 above and below the upper and lower surfaces, respectively, of shunt plates 3*a* . . . 3*e* in FIG. 5 is advantageous in the respects of (1) saving time and cost in applying secondary windings 8 and 9 to individual columns of magnetic switching elements rather than to individual magnetic switching elements in a coordinate array of the latter elements disposed in rows and columns, (2) expeditiously increasing the number of turns in secondary windings 8 and 9 to reduce the driving current to a minimum value for actuating the reeds of the sealed-in reed switches into break and make circuits, (3) miniaturizing the coordinate array of magnetic switching elements in the column direction to save weight, bulk and cost, and (4) reducing the overall cost of an electronic switching system as a consequence of achieving the next preceding features 1 through 3.

A problem associated with increasing the number of turns of secondary windings 8 and 9 to provide low-value energizing current therefor as previously pointed out is related to the external configuration of the spool. The spool in the prior art is manufactured on mass and reliability bases by molding a dielectric or plastic material onto shunt plate 3 to provide an integral structure by use of a mold including members 16 and 17 movable in opposite vertical directions as illustrated by the arrows in FIG. 6(*a*). Thus, the molding members 16 and 18 are divided essentially in a horizontal plane by shunt plate 3. FIG. 6(*b*) indicates that the dielectric spools can be individually molded by utilizing molding members 16 and 17 movable in opposite horizontal directions for providing two pairs of spaced integral flanges 19 and 13, and 19′ and 13′ for use in FIGS. 3, 4 and 5 as above explained. These flanges are essential for enabling the expeditious application of the electric windings 6, 7, 8 and 9 of many turns to each spool from the standpoints of speed and reliability.

FIG. 7 shows one magnetically controlled switching element usable in each of rows $X_1$, $X_2$ . . . $X_n$ and columns $Y_1$, $Y_2$ . . . $Y_n$ in FIG. 5 and including integral spool 21 having a portion 21*a* molded above the upper surface of shunt plate 3 and a portion 21*b* molded below the lower surface of shunt plate 3 to extend in directions normal to the latter surfaces. Flange 13 engages the upper surface of shunt plate 3 while flange 19 is axially spaced therefrom. It is understood that flange 13′, not shown, engages the under surface of shunt plate 3 while flange 19′ is axially spaced therefrom. Primary winding 6 and secondary winding 8 and primary winding 7 and secondary winding 9 are applied between flanges 13 and 19 and 13′ and 19′, respectively, as above mentioned. It is noted that spool 21 is provided with axial opening 60 and external surface 60*a*, respectively, having oblong configurations disposed in a direction transverse to the common axis of shunt plate 3 as above mentioned relative to FIG. 3, Sealed-in reed switches 1 and 1′ and magnetic cores 2 and 2′ are disposed in oblong opening 60 to position the overlapping edges 27 and 27′ of the reeds between the opposite surfaces of shunt plate 3, i.e., approximately at the midpoint of the thickness of the latter plate, as hereinbefore mentioned regarding FIGS. 1(*a*) and 1(*b*). It is seen that magnetic cores 2 and 2′ have lengths that are substantially coextensive with the lengths of the reed switches. While FIG. 7 shows the use of two reed switches, it is understood that one or three or more reed switches may be utilized depending on the required flexibility of a given electronic switching system. The oblong openings permit an expeditious assembly of the switches and magnetic cores interiorly of the spools. Thus, FIG. 7 illustrates a magnetic switching unit which operates essentially in the manner previously described for the operation of the corresponding magnetic switching element in FIGS. 1(*a*) and 1(*b*). FIGS. 9(*a*) and 9(*b*) show how the spool halves 21*a* and 21*b* formed as shown in FIG. 6(*b*) are molded to shunt plate 3 by positioning the latter between the flanges 13 and 13′ of the larger diameter. Each spool in FIG. 9(*b*) includes an opening 12.

FIG. 8 illustrates a coordinate array of magnetic switching units according to the present invention and including 8 x 8 magnetically controlled switching elements. Magnetic shield plates 4*a*, 4*b*, 4*c* . . . 4*n* are vertically positioned between the respective common secondary windings 8 and 9, i.e., between columns of switching elements, on upper and lower surfaces of magnetic shunt plates 3*a*, 3*b*, 3*c* . . . 3*n*, and are magnetically coupled to the latter plates to reduce magnetic intercoupling between such adjacent secondary windings above and below the respective shunt plates. The uppermost and free ends of the shield plates are firmly held in position by fixtures 9*a* and 9*b* formed of suitable non-magnetic material. It is noted that switch units 21, 22, 23 . . . 23*n* constitute one row of switch units, and similar rows of switch units as well as columns of switch units are formed in the manner above explained regarding FIGS. 4 and 5. One of the terminals of each of reed switches 1*a* and 1′*a* shown in FIGS. 7 and 8, one of the terminals of each of reed switches 1*b* and 1′*b* shown in FIGS. 7 and 8, as well as two terminals for other twin-type reed switches shown in FIGS. 7 and 8 are connected to bus bars 10*a*, 10′*a*, 10*b* and 10′*b* which form a multiple connection in the column-direction and one of the other terminals of each pair of terminals of switches 1*a* and 1′*a*, 1*b* and 1′*b*, and the like are connected to bus bars 11*a*, 11'*a*, 11*b*, 11'*b*, and so on which provide multiple connection in the row-direction.

Thus, the column bus bars positioned in the column direction and the row bus bars positioned in the row direction are connected via group of terminals 103 and 104, and terminal plates 105 and 106, respectively, to receive the incoming signals. Thus, signals incoming on leads 103 service the rows switching units while signals incoming on leads 104 service the columns of switching units. The terminals of each reed switches 1*a* and 1'*a* are positioned by fixture 101 of synthetic resin in each of spools 21 . . ., together with the reed switches and magnetic cores. Although FIG. 8 illustrates each magnetic switch unit containing two sealed-in reed switches and two magnetic cores for the purpose of this explanation, it is understood that the present invention is equally as effective in coordinate arrays in which each magnetic switch embodies one or three or more of the aforenoted reed switches and magnetic cores.

TABLE I

| Item classification | Percent: Volume | Weight | Driving current |
|---|---|---|---|
| Conventional example | 100 | 100 | 100 |
| Embodiment of the invention | 48 | 52 | 40 |

TABLE II

| Item classification | No. of turns | Winding time, percent | Driving current, amp |
|---|---|---|---|
| Conventional example | 19 T–38 T | 100 | 10 |
| | 19 T–38 T | 65 | 10 |
| Embodiment of the invention | 50 T–100 T | 98 | 4 |
| | 100 T–200 T | 130 | 2 |

Tables I and II show the technical merits achieved by the device for coordinate selection according to the present invention which is characterized in the use of common secondary windings for each column of magnetic switch units as compared with the conventional device using secondary windings wound on each magnetic switch unit. Thus, an embodiment of the present invention involves about ½ of the volume, weight, and driving current, about 65% of the man hours for the winding process, and a manufacturing cost of approximately 65% utilizing the same number of turns, when compared with those of conventional coordinate magnetic switch.

What is claimed is:

1. A coordinate switching device, comprising:
   - a plurality of elongated magnetic plates;
   - a plurality of hollow dielectric spools formed on each of said plates to extend in spaced relation along a common axis on opposite surfaces of maximum dimension of each of said plates in a direction normal thereto;
   - at least one sealed-in reed switch disposed interiorly of each of said spools and including two reeds having overlapping adjacent ends positioned between said opposite surfaces of each of said plates; said overlapping ends actuable to engage in a make-circuit and to disengage in a break-circuit;
   - magnetic core means positioned interiorly of each of said spools in proximity of said reed switch disposed therein; said plates arranged side-by-side along edges of maximum dimension in one plane to dispose said spools, switches and magnetic means in rows and columns to form a coordinate array of crosspoint elements;
   - a plurality of first electric windings, each applied externally to portions of said spools in each row thereof on opposite surfaces of each of said plates;
   - and a plurality of second electric windings, each applied onto one column of said first windings on said spool portions on said opposite surfaces of said side-by-side plates.

2. The switching device according to claim 1 which includes a plurality of magnetic shields, each positioned between adjacent columns of said first windings on one of said opposite surfaces of said side-by-side plates.

3. The switching device according to claim 1 in which each of said spools is formed on said opposite surfaces of each of said plates with an axial opening and an external surface having corresponding oblong configurations of which opposite sides having maximum dimensions are disposed in a direction transverse to said common axis of each of said magnetic plates.

4. The switching device according to claim 1 in which each of said first windings is applied in opposite directions to adjacent spool portions in each of said rows of spools on said opposite surfaces of each of said magnetic plates.

5. The switching device according to claim 4 in which each of said second windings is applied onto one column of said second windings applied to said spool opposite external surfaces having said maximum dimension.

6. The switching device according to claim 1 in which a second sealed-in reed switch including two reeds having overlapping adjacent ends is disposed interiorly of each of said spools in proximity of said one switch and magnetic means already disposed therein to position said last-mentioned overlapping adjacent ends between said opposite surfaces of one of said magnetic plates.

7. The switching device according to claim 1 which includes first terminals for each of said first windings in each row thereof on said opposite surfaces of said side-by-side plates, and second terminals for each of said second windings applied to said one column of said first windings on said opposite surfaces of said side-by-side plates.

8. The switching device according to claim 7 which includes a plurality of bus bars, each connected to said first terminals for said first windings.

9. The switching device according to claim 7 which includes a plurality of bus bars, each connected to said second terminals for said second windings.

10. The switching device according to claim 7 which includes a plurality of first bus bars, each connected to said first terminals for said first windings; and a plurality of second terminals for said second windings.

11. A coordinate switching device embodying a coordinate array of crosspoint elements disposed in rows and columns, comprising:
   - a plurailty of elongated magnetic plates;
   - a plurailty of dielectric spools formed onto each of said plates to extend in spaced relation along a common axis on opposite surface of maximum dimension in a direction normal thereto, said spools formed with axial holes and external surfaces having corresponding oblong configurations and with pluralities of pairs of spaced flanges, each of said spools having two pairs of said flanges of which each pair includes flanges of different dimensions, said last-mentioned flanges of larger dimensions of said spools disposed adjacent said plates and said last-mentioned flanges of smaller dimensions spaced in an axial direction from said plates, said spools positioned on said opposite surfaces of said plates to dispose opposite external surfaces of maximum dimension in a direction transverse to said axis of said opposite surfaces of said plates;
   - a plurality of pairs of first and second electric windings of which said first winding of each winding pair is applied to said external surface of one of said spools between a first two of said flanges of different dimensions adjacent to one of said two opposite surfaces of one of said plates and of which said second winding of each winding pair is applied to said external surface of said one of said spools between a second two of said flanges of different dimensions adjacent to the other of said two opposite surfaces of said one plate;

a plurality of sealed-in reed switches of which at least one is disposed in said axial opening of each of said spools, said one switch including two reeds having overlapping adjacent ends actuable to engage in a make-circuit and to disengage in a break-circuit, said overlapping reed ends positioned between said opposite surfaces of said plates;

a plurality of magnetic core means, each disposed adjacent to said one reed switch in each of said spools;

said plates arranged side-by-side along edges of maximum dimensions in one plane to form an array of said crosspoint elements disposed in rows and columns, each of said last-mentioned elements including at least one spool, said one reed switch, said core means, and one of said winding pairs including one of first windings and one of said second windings;

a plurality of pairs of third and fourth electric windings, each of said third windings applied onto one column of said first windings between said first two flanges of different dimensions adjacent to said one of said two opposite surfaces of said plates in said one plane and each of said fourth windings applied onto one column of said second windings between said first and second flanges of different dimensions adjacent to said other of said two opposite surfaces of said last-mentioned plates;

a plurality of magnetic shields, each disposed between adjacent third and fourth windings at said respective one and other of said two opposite surfaces of said plates in said one plane;

a plurality of first bus bars, each connected to one reed of each of said reed switches in each of said rows thereof at said one of said two opposite surfaces of said plates in said one plane;

a plurality of second bus bars, each connected to the other reed of each of said reed switches in said columns thereof at said other of said two opposite surfaces of said plates in said one plane;

a pluraílty of first terminals connected to said first bus bars for supplying energizing current to said first and second windings on said spools in said respective rows thereof;

and a plurality of second terminals connected to said second bus bars for supplying energizing current to said third and fourth windings on said spools in said respective columns thereof.

References Cited

UNITED STATES PATENTS

| | | | |
|---|---|---|---|
| 3,005,072 | 10/1961 | Brown | 335—152 |
| 3,293,578 | 12/1966 | Else | 335—152 |
| 3,386,056 | 5/1968 | Frydman | 335—112 |

OTHER REFERENCES

A. Feiner and R. L. Peek, Jr., Bell Laboratories Record, vol. 42, 1964.

BERNARD A. GILHEANY, Primary Examiner

H. BROOME, Assistant Examiner